United States Patent
Asada et al.

(10) Patent No.: US 10,620,311 B2
(45) Date of Patent: Apr. 14, 2020

(54) DETECTION APPARATUS AND DETECTING METHOD

(71) Applicant: FURUNO ELECTRIC CO., LTD., Nishinomiya (JP)

(72) Inventors: Yasunobu Asada, Kobe (JP); Masahiro Minowa, Nishinomiya (JP)

(73) Assignee: FURUNO ELECTRIC CO., LTD., Tokyo (JP)

( * ) Notice: Subject to any disclaimer, the term of this patent is extended or adjusted under 35 U.S.C. 154(b) by 296 days.

(21) Appl. No.: 15/548,320

(22) PCT Filed: Dec. 15, 2015

(86) PCT No.: PCT/JP2015/085007
§ 371 (c)(1),
(2) Date: Aug. 2, 2017

(87) PCT Pub. No.: WO2016/125399
PCT Pub. Date: Aug. 11, 2016

(65) Prior Publication Data
US 2018/0017676 A1    Jan. 18, 2018

(30) Foreign Application Priority Data
Feb. 2, 2015 (JP) ................. 2015-018695

(51) Int. Cl.
*G01S 13/95* (2006.01)
*G01S 7/295* (2006.01)
*G01S 7/53* (2006.01)

(52) U.S. Cl.
CPC ............ *G01S 13/951* (2013.01); *G01S 7/295* (2013.01); *G01S 7/53* (2013.01); *G01S 13/95* (2013.01); *Y02A 90/18* (2018.01)

(58) Field of Classification Search
CPC ........ G01S 13/951; G01S 13/95; G01S 7/295; G01S 7/53; Y02A 90/18
(Continued)

(56) References Cited

U.S. PATENT DOCUMENTS 5,202,690 A * 4/1993 Frederick .............. G01S 13/953
342/26 B
5,583,972 A * 12/1996 Miller ................... G01S 13/951
345/419
(Continued)

FOREIGN PATENT DOCUMENTS

JP    1-182783 A    7/1989
JP    7-181245 A    7/1995
(Continued)

OTHER PUBLICATIONS

Extended European Search Report dated Aug. 10, 2018 in Patent Application No. 15881216.4, 9 pages.
(Continued)

*Primary Examiner* — Marc Anthony Armand
(74) *Attorney, Agent, or Firm* — Xsensus LLP (57) ABSTRACT

In a two-dimensional data structure stored in a memory of a weather radar apparatus, a height of an obstacle may be specified by a single parameter when the obstacle blocking a transmission signal is located in an observation area. A signal processor may process a reception signal based on blocking area specifying information. Thereby, a detection apparatus and a detecting method can specify with a smaller data amount an area where a transmission signal is blocked when performing a detection using transmission and reception signals.

22 Claims, 8 Drawing Sheets

(58) Field of Classification Search
USPC .................................................. 342/26 D
See application file for complete search history.

(56) References Cited

U.S. PATENT DOCUMENTS

| | | | | |
|---|---|---|---|---|
| 5,648,782 | A * | 7/1997 | Albo | G01S 13/951 |
| | | | | 342/26 D |
| 5,907,568 | A * | 5/1999 | Reitan, Jr. | G01S 7/22 |
| | | | | 342/26 B |
| 6,384,830 | B2 * | 5/2002 | Baron | G01W 1/10 |
| | | | | 345/473 |
| 6,469,664 | B1 * | 10/2002 | Michaelson | B63B 43/18 |
| | | | | 342/357.31 |
| 8,604,963 | B1 * | 12/2013 | Kronfeld | G01S 13/95 |
| | | | | 342/26 B |
| 2005/0100076 | A1 * | 5/2005 | Gazdzinski | H04B 1/7176 |
| | | | | 375/130 |
| 2008/0309549 | A1 * | 12/2008 | Chabah | G01S 7/064 |
| | | | | 342/26 B |
| 2010/0253573 | A1 * | 10/2010 | Holzheimer | G01S 7/40 |
| | | | | 342/176 |

FOREIGN PATENT DOCUMENTS

| | | |
|---|---|---|
| JP | 10-104356 A | 4/1998 |
| JP | 10-160858 A | 6/1998 |
| JP | 11-211822 A | 8/1999 |
| JP | 2001-118054 A | 4/2001 |
| JP | 2001-242246 A | 9/2001 |
| JP | 2001-296116 A | 10/2001 |
| JP | 2004-354252 A | 12/2004 |
| JP | 2006-220444 A | 8/2006 |
| JP | 2007-248355 A | 9/2007 |
| JP | 2009-8440 A | 1/2009 |
| JP | 2009-25083 A | 2/2009 |
| JP | 2009-69020 A | 4/2009 |
| JP | 4667426 B2 | 4/2011 |
| JP | 2012-21825 A | 2/2012 |

OTHER PUBLICATIONS

International Search Report dated Mar. 15, 2016 in PCT/JP2015/085007 filed Dec. 15, 2015.

* cited by examiner

OBSERVATION RESULT
WITH COMPARATIVELY LOW ELEVATION ANGLE φ

FIG. 6

OBSERVATION RESULT
WITH COMPARATIVELY HIGH ELEVATION ANGLE φ

FIG. 7

DISPLAY EXAMPLE OF BLOCKING AREA
SPECIFYING INFORMATION

FIG. 8

DETECTION APPARATUS AND DETECTING METHOD

TECHNICAL FIELD

This disclosure relates to a detection apparatus and a detecting method.

BACKGROUND ART

As detection apparatuses which measure a meteorological phenomenon, such as precipitation, weather radar apparatuses are known (e.g., see Patent Document 1). The weather radar apparatus disclosed in Patent Document 1 acquires a horizontally polarized wave reception signal and a vertically polarized wave reception signal from reflection waves caused by emitting a horizontally polarized wave and a vertically polarized wave, respectively. The weather radar apparatus further calculates a horizontal radar reflection factor Zh, a propagation phase difference change rate Kdp, etc. based on the horizontally polarized wave reception signal and the vertically polarized wave reception signal.

The weather radar apparatus obtains a three-dimensional distribution of a precipitation intensity in an observation range based on the horizontal radar reflection factor Zh, the propagation phase difference change rate Kdp, etc. The weather radar apparatus measures the precipitation intensity for each given space. The given space is defined as a three-dimensional space having a given length (depth) in horizontal directions and a given height in vertical directions.

The weather radar apparatus further stores blocking map data as data specifying an area where a radar beam emitted by the weather radar apparatus is at least partially blocked. For every mesh segment formed for each altitude in the observation range, the weather radar apparatus specifies whether the mesh segment indicates an area where at least a part of the radar beam is blocked by using the blocking map data. Then, the weather radar apparatus calculates a rainfall intensity by using the blocking map data for each area of the observation range.

REFERENCE DOCUMENT OF CONVENTIONAL ART

Patent Document

Patent Document 1: JP4667426B (claim 1)

DESCRIPTION OF THE DISCLOSURE

Problem to be Solved by the Disclosure

Incidentally, in meteorological observation using a weather radar apparatus, topographical information indicating whether an obstacle is located in an observation area is extremely important. Examples of the obstacles include structures (such as a building), a mountain, etc. In the observation using a radar transmission signal, if the radar transmission signal is blocked by the obstacle, it practically becomes impossible to observe the area beyond the area where the obstacle is located. Therefore, in the meteorological observation, such as precipitation observation, it is extremely important that the radar apparatus can grasp in advance an observable area by the radar transmission signal and a non-observable area due to an obstacle.

In the non-observable area, echo signals are not observed despite rain actually occurring. For this reason, if the weather radar apparatus does not grasp the area (non-observable area), it may display an observation result that precipitation does not occur in the area. It is requested that the weather radar apparatus further reduces such erroneous display. Therefore, the weather radar apparatus requires data (topographical data etc.) for specifying the obstacle in each observation area.

However, it may be said that the configuration described in Patent Document 1 requires the data for specifying the obstacle for every given space specified by three-dimensional information of an east-west position, a north-south position, and an altitude. That is, since the data specifying the obstacle is required for every given space in the three-dimensional space, three-dimensional data cells are required, resulting in a large volume. Further, the weather radar apparatus requires complicated processing for utilizing a significant amount of the three-dimensional data to specify an obstacle.

This disclosure is made in view of the above situations, and aims to provide a detection apparatus and a detecting method, which are capable of specifying with a smaller data amount an area where a transmission signal is blocked when performing a detection using transmission and reception signals.

SUMMARY OF THE DISCLOSURE (1) In order to solve the problem, a detection apparatus according to one aspect of the present disclosure may include a signal processor, a memory, and a controller. The signal processor may detect a target in a given three-dimensional observation area by using a reception signal caused by reflection of a transmission signal. The memory may store in a two-dimensional data structure, blocking area specifying information in which a height of an obstacle blocking the transmission signal is specified by a single parameter when the obstacle is located in the observation area. The controller may control processing of the reception signal of the signal processor based on the blocking area specifying information stored in the memory.

(2) The blocking area specifying information may specify plane coordinates of the obstacle by two parameters.

(3) The two-dimensional data structure may be a matrix structure including a plurality of cells. Two of the three parameters may be defined as a component of a row and a component of a column of the matrix, respectively, and the other one parameter is stored in the corresponding cell.

(4) A plurality of unit areas may be defined at the bottom of the observation area. Each of the cells may be associated with the corresponding unit area. The two parameters specifying plane coordinates of the unit area at the bottom may be defined as the component constituting the row and the component constituting the column in the matrix. The single parameter specifying the height of the obstacle may be stored in the corresponding cell.

(5) The plane coordinates may be polar coordinates having an origin at a transmitting location where the transmission signal is transmitted. The two parameters specifying the polar coordinates may be a coordinate in an azimuth direction around the transmitting location and a coordinate in a distance direction from the transmitting location.

(6) The single parameter specifying the height of the obstacle may be one of an elevation angle and a depression angle of the obstacle, having an origin at a transmitting location where the transmission signal is transmitted.

(7) In a case where a parameter in a distance direction having an origin at a transmitting location where the transmission signal is transmitted, when the value of the parameter specifying the height of the obstacle increases, the parameter specifying the height of the obstacle may be stored.

(8) The signal processor may change processing of the reception signal between a case where the transmission signal is transmitted to a given unit area of the observation area where the obstacle is located and a case where the transmission signal is transmitted to a unit area where the obstacle is not located.

(9) The signal processor may display the blocking area specifying information specified by the two-dimensional data structure, in at least one mode among a table of a matrix, a two-dimensional image, and a three-dimensional image.

(10) The signal processor may generate an index indicating reliability of the reception signal.

(11) The signal processor may generate display data to display at least one of the index indicating the reliability and the blocking area specifying information in association with topography data of the observation area.

(12) The detection apparatus may further include a display device configured to display a content based on the display data.

(13) The detection apparatus may be one of a weather radar apparatus, a radar apparatus, and an ultrasonic detection apparatus.

(14) In order to solve the problem, a detecting method according to one aspect of the present disclosure may include a detection and a control. In the detection, a target in a given three-dimensional observation area may be detected by using a reception signal caused by reflection of a transmission signal. In the control, processing of the reception signal of the signal processor may be controlled based on blocking area specifying information in which a height of an obstacle blocking the transmission signal is specified by a single parameter when the obstacle is located in the observation area.

Effect of the Disclosure

According to the present disclosure, an area where a transmission signal is blocked when performing a detection using transmission and reception signals may be specified with a smaller data amount.

MODES FOR CARRYING OUT THE DISCLOSURE

Hereinafter, modes for carrying out the present disclosure are described with reference to the accompanying drawings. The present disclosure may broadly be applied as a detection apparatus and a detecting method.

Figure 1:
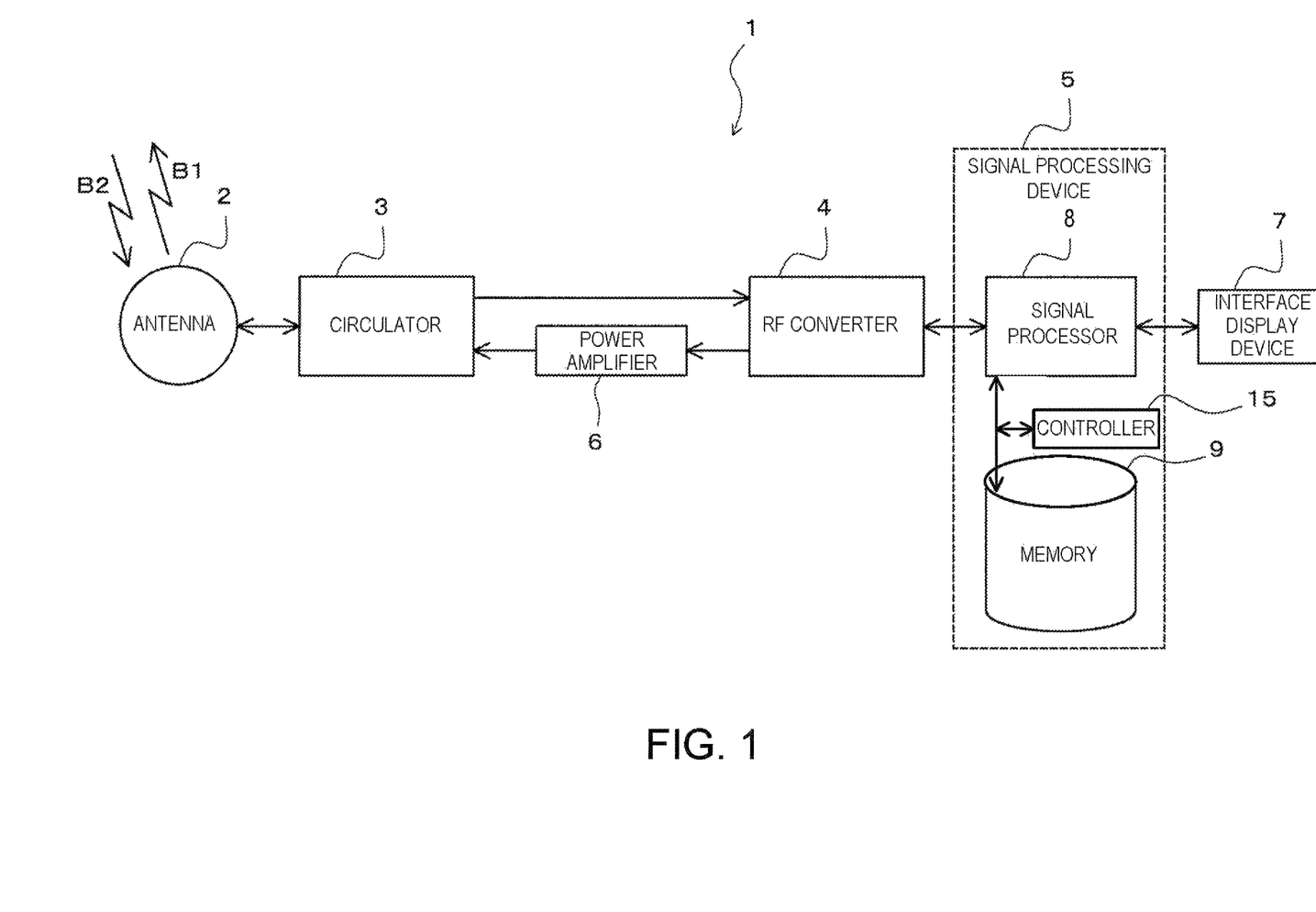
FIG. 1 is a block diagram of a weather radar apparatus according to one embodiment of the present disclosure.
Figure 2:
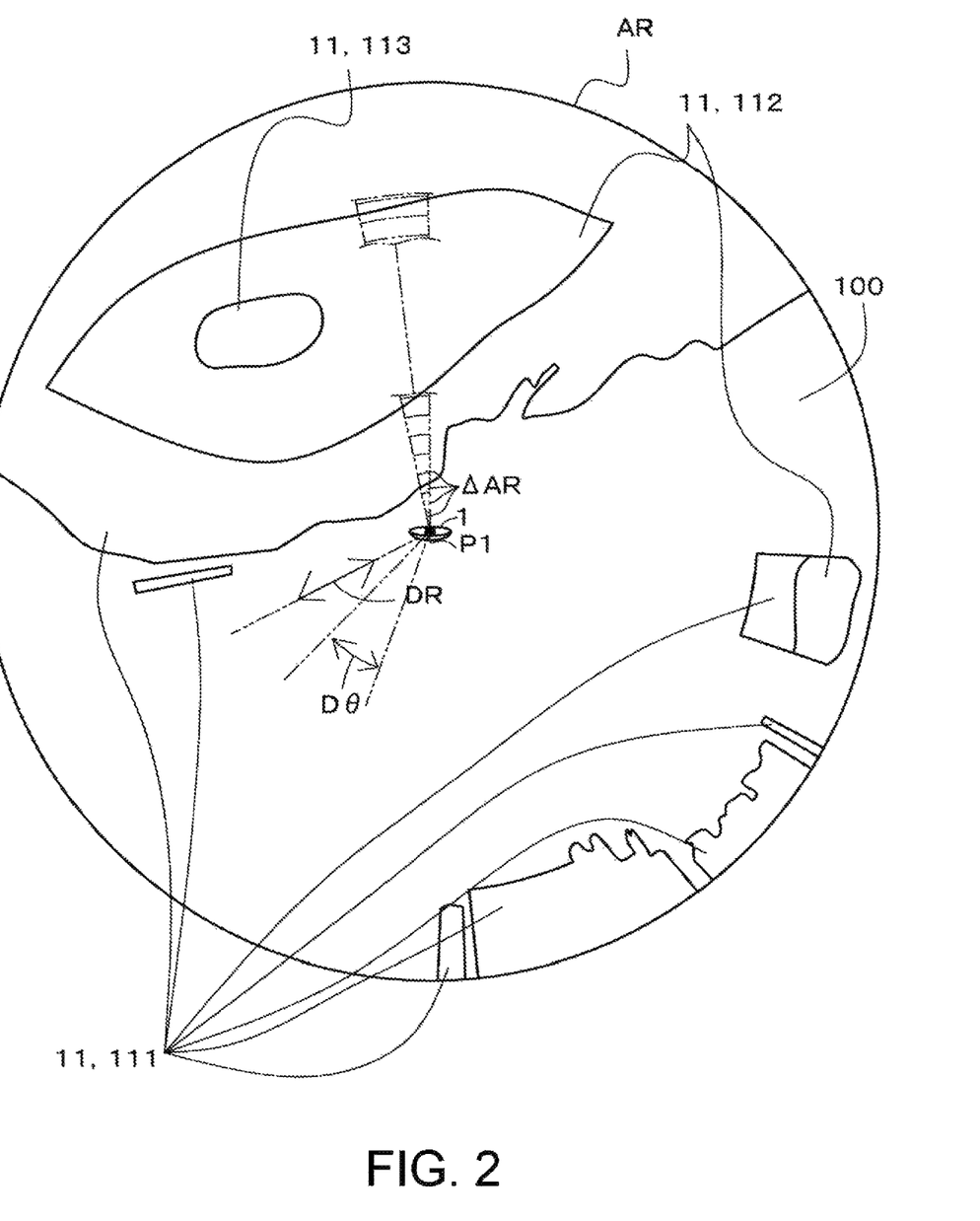
FIG. 2 is a schematic plan view of an observation area including a transmitting and receiving location of the weather radar apparatus and the periphery thereof.
Figure 3:
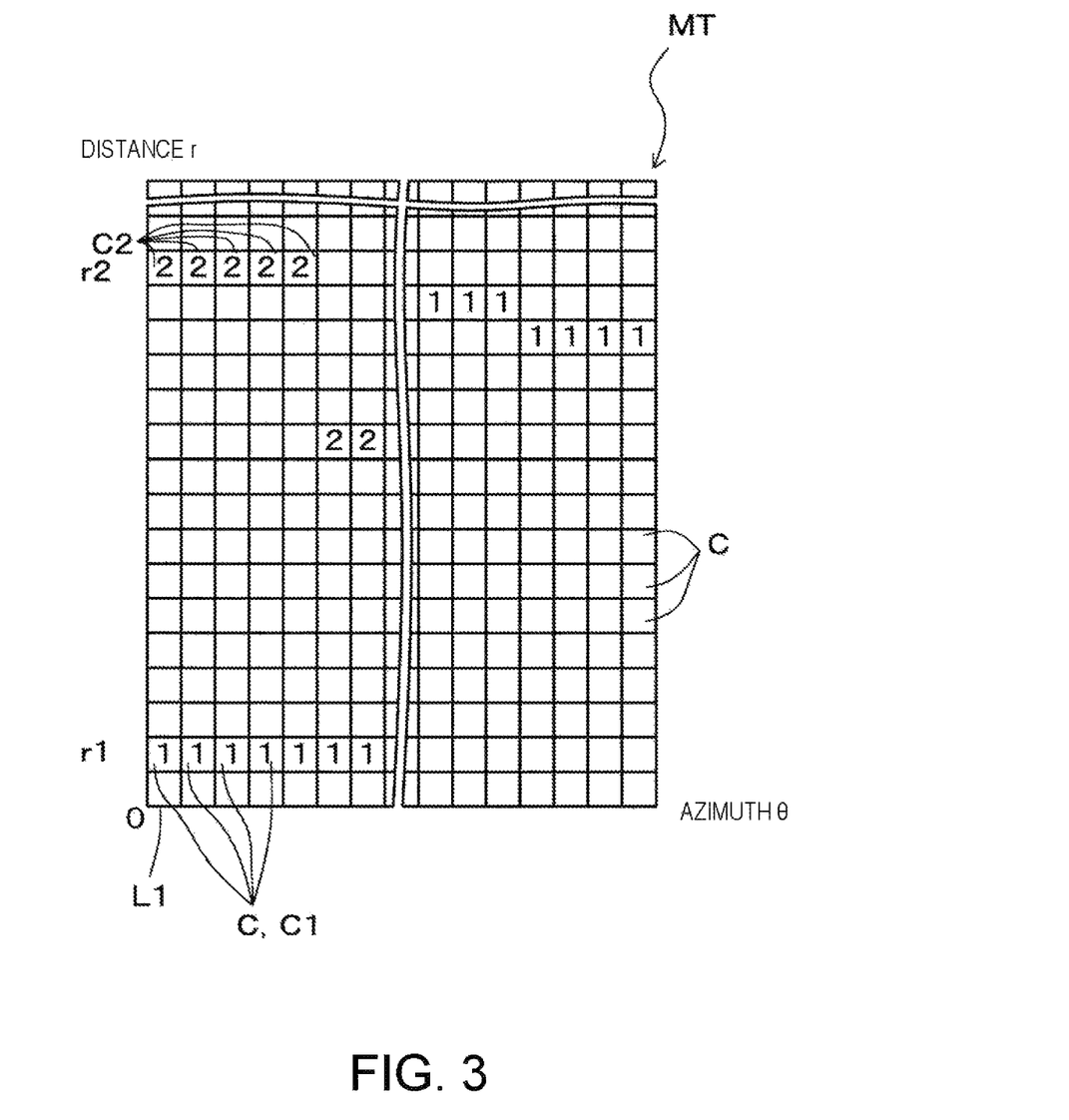
FIG. 3 is a view conceptually illustrating a data structure stored in a memory of the weather radar apparatus.
Figure 4:
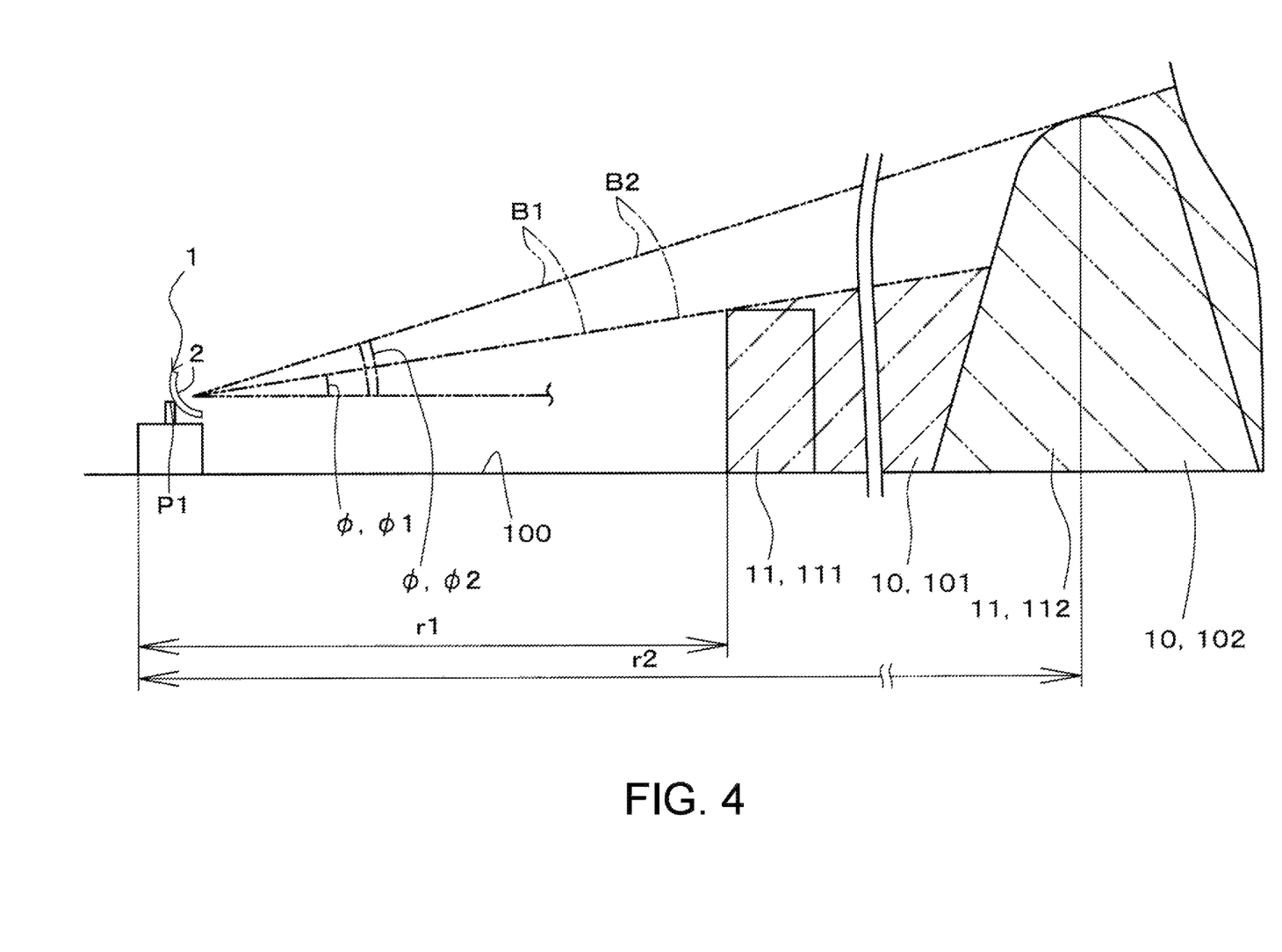
FIG. 4 is a schematic view illustrating an elevation angle and a blocking area.

FIG. 1 is a block diagram of a weather radar apparatus 1 as a detection apparatus according to one embodiment of the present disclosure. FIG. 2 is a schematic plan view of an observation area AR including a transmitting and receiving location P1 of the weather radar apparatus 1 and the periphery thereof. FIG. 3 is a view conceptually illustrating a data structure stored in a memory 9 of the weather radar apparatus 1. FIG. 4 is a schematic view illustrating an elevation angle $\varphi$ and a blocking area 10 (101 and 102). FIGS. 5 to 8 are views illustrating examples of an image displayed on a display screen 7a of an interface display device 7 of the weather radar apparatus 1.

With reference to FIGS. 1 and 2, the weather radar apparatus 1 of this embodiment may be installed at the given transmitting and receiving location P1. In this embodiment, the observing location P1 may be located on a flat surface 100 of the ground surface (flat ground). Further, an obstacle 11 (111, 112 and 113) may be located around the observing location P1.

The weather radar apparatus 1 may observe a meteorological weather around the transmitting and receiving location P1. More specifically, the weather radar apparatus 1 may detect precipitation as a target around the transmitting and receiving location P1 and calculate a precipitation intensity. "Precipitation" here may mean moisture falling from the sky to the ground, such as rain, snow, graupel, and sleet.

In this embodiment, the weather radar apparatus 1 may adopt a dual polarization method. That is, the weather radar apparatus 1 may emit a transmission signal B1 including a horizontally polarized wave and a vertically polarized wave, and then receive a reception signal B2. The reception signal B2 may include a horizontally polarized wave reception signal and a vertically polarized wave reception signal. In addition, the reception signal B2 may include an echo signal caused by the transmission signal B1 reflecting on an object such as moisture within the atmosphere and the obstacle 11.

The weather radar apparatus 1 may include an antenna 2, a circulator 3, an RF converter 4, a signal processing device 5, a power amplifier 6, and the interface display device 7.

The interface display device 7 may include a user-interface panel (not illustrated) which may be operated by an operator. The operator may operate the weather radar apparatus 1 by controlling this user-interface panel.

The antenna 2 may be a radar antenna (signal transmitting-receiving unit) capable of transmitting the transmission signal B1 having a narrow directivity. Further, the antenna 2 may be configured to be capable of receiving the reception signal B2. The weather radar apparatus 1 may measure time from the transmission of the transmission signal B1 to the reception of the reception signal B2. Thus, the weather radar apparatus 1 may detect a distance r to the object. The antenna 2 may be configured to be rotatable 360° on a horizontal plane. Moreover, the antenna 2 may be configured so that the elevation angle φ may be changed within the range of 0° to 180°. The antenna 2 may be configured to repeatedly transmit and receive the signals B1 and B2 while changing the directions of transmitting and receiving the signals B1 and B2 (azimuth θ, elevation angle φ).

Further, data indicating a currently oriented direction (azimuth θ) of the antenna 2 may be outputted from the antenna 2 to the signal processing device 5. As a result, when reading the reception signal B2, the weather radar apparatus 1 may acquire the reached position of the reception signal B2, as polar coordinates of the distance r, the azimuth θ (antenna angle), and the elevation angle φ.

With the above configuration, the weather radar apparatus 1 may detect the periphery of the observing location P1 in a hemispherical shape. The observation area AR, that is, the weather observable area of the weather radar apparatus 1 may be, for example, a circular area with a radius of about several km to several tens km, centering on the transmitting and receiving location P1 in a plan view. Further, the weather radar apparatus 1 may observe the precipitation intensity over a given altitude range.

Note that in this embodiment, the operation from a transmission of the transmission signal B1 to a transmission of the next transmission signal B1 may also be referred to as "sweep." Further, the operation of rotating the antenna by 360° while transmitting and receiving the signals B1 and B2 may also be referred to as "scanning."

Example of the scanning operation in this embodiment may include a volume scan, an RHI scan, a sector RHI scan, a sector PPI scan, and a PPI scan.

The circulator 3 may be configured to output the transmission signal outputted from the power amplifier 6 to the antenna 2. Further, the circulator 3 may be configured to output the reception signal B2 received by the antenna 2 to the RF converter 4.

The RF converter 4 may up-convert and amplify to a given RF frequency band the transmission signal generated by a signal processor 8 of the signal processing device 5, and output it to the power amplifier 6. The power amplifier 6 may amplify the transmission signal and then output it to the circulator 3.

Further, the RF converter 4 may down-convert and amplify the received reception signal to an IF frequency band.

The signal processing device 5 may include the signal processor 8 configured to process the reception signal, the memory 9, and a controller 15 configured to control the processing of the reception signal by the signal processor 8 based on blocking area specifying information (described later) stored in the memory 9.

The signal processor 8 may be configured to detect the precipitation as a target in a given three-dimensional observation area AR using the reception signal B2 caused by the reflection of the transmission signal B1. Further, the signal processor 8 may be configured to calculate the precipitation intensity. The signal processor 8 and the controller 15 may be configured using hardware including a CPU, RAM(s), and ROM(s) (not illustrated). Moreover, the signal processor 8 and the controller 15 may be configured using software including a signal processing program stored in the ROM.

The signal processing program may be a program which causes the signal processor 8 and the controller 15 to execute the detecting method of this embodiment. The hardware and the software may be configured to cooperate with each other. The signal processor 8 and the controller 15 may be configured to perform the processing described below for every scan.

The signal processor 8 may AD-convert the amplified reception signal to sample the reception signal in an analog format and convert the amplified reception signal into a reception signal composed of a plurality of bits (reception data). The reception signal may include data specifying the intensity of the echo signal (echo level) in the reception signal B2 received by the antenna 2. The reception signal may include horizontally polarized wave reception data obtained by converting the horizontally polarized wave reception signal into digital data and vertically polarized wave reception data obtained by converting the vertically polarized wave reception signal into digital data.

The signal processor 8 may calculate the precipitation intensity for every unit area ΔAR of the observation area AR using, for example, the horizontally polarized wave reception data and the vertically polarized wave reception data. Thus, the signal processor 8 may obtain a three-dimensional distribution of the precipitation intensity. In other words, the signal processor 8 may obtain the precipitation intensity for over the entire observation area AR.

In this embodiment, the signal processor 8 may calculate the precipitation intensity in each unit area ΔAR by using a polar coordinate system having the origin at the transmitting and receiving location P1. Note that in FIG. 2, only some of the plurality of unit areas ΔAR are illustrated. In this embodiment, a dimension of the unit area ΔAR in an azimuth direction Dθ with respect to the transmitting and receiving location P1 may be set to about 0.5 deg.

Further, a dimension of the unit area ΔAR in a distance direction DR (a direction away from the observing location, radial direction) may be set to, for example, about 100 m. Moreover, a dimension of the unit area ΔAR in a height direction with respect to the transmitting and receiving location P1 may be set to, for example, several degrees of the elevation angle φ. That is, the signal processor 8 may calculate the precipitation intensity for every unit area ΔAR having the width of 0.5 deg in the azimuth direction Dθ, the length of 100 m in the distance direction DR, and the height of several degrees of the elevation angle φ in the height direction Dφ.

The signal processor 8 may generate data specifying the precipitation intensity for each unit area ΔAR. This data may be set so that the color displayed on the display screen 7a changes depending on the precipitation intensity.

With reference to FIGS. 1 to 5 and 8, the signal processor 8 and the controller 15 may set part(s) of the observation area AR where it is impossible or practically impossible to receive the echo signal, as the blocking area 10 (101 and 102). The signal processor 8 may be configured not to display the observation result of the precipitation on the display screen 7a for the blocking area 10 (101 and 102).

With the above configuration, the signal processor 8 may be configured to change the processing of the reception signal B2 between a case where the antenna 2 receives the reception signal B2 from the unit area ΔAR where the obstacle 11 is located and a case where the antenna 2 receives the reception signal B2 from the unit area ΔAR where the obstacle 11 is not located.

Note that at a position on the display screen 7a indicating the blocking area 10, an echo EC may not be displayed. In this case, for example, the signal processor 8 may set the echo level (value of echo data) detected in the blocking area 10 to a lowest value (zero) so that the echo data is not used in signal processing after this setting. Alternatively, the signal processor 8 may invalidate the echo data detected in the blocking area 10. In this case, the echo data detected in the blocking area 10 may be set to an invalid value so that the echo data is not used in signal processing after this setting. Furthermore, the signal processor 8 may add a flag to the echo data detected in the blocking area 10. In this case, the content of the signal processing after the flag addition may be changed depending on whether the flag is assigned in the reception signal.

The signal processor 8 may output data specifying the precipitation intensity in each unit area ΔAR and data specifying the blocking area 10, to the interface display device 7. Thus, the display screen 7a of the interface display device 7 may display an image illustrating a precipitation distribution in the observation area AR. Details of this image are described later.

Note that the blocking area 10 may be an area farther than the obstacle 11 and where the transmission signal B1 emitted from the antenna 2 is blocked by the obstacle 11 (111, 112 and 113) and the detection by the transmission signal B1 is impossible. Examples of the obstacle 11 (111, 112 and 113) described above may include structures (such as a building), a mountain, etc.

The signal processor 8 may be connected to the memory 9 and the controller 15. The memory 9 may store the blocking area specifying information as information used by the signal processor 8. The memory 9 may be a nonvolatile memory device formed using a storage medium such as an HDD (Hard Disk Drive), an SSD (Solid State Drive), a ROM (Read Only Memory), etc. The memory 9 may store a data structure expressed by a matrix MT illustrated in FIG. 3.

When the obstacle 11 blocking the transmission signal B1 is located in the observation area AR, the memory 9 may store in a two-dimensional data structure, the blocking area specifying information in which the height of the obstacle 11 is specified by a single parameter φ and plane coordinates of the obstacle 11 are specified by two parameters r and θ. The two-dimensional data structure may be a matrix structure including a plurality of cells C. In this embodiment, the matrix MT including the plurality of cells C may be defined.

The controller 15 may be configured to be capable of causing the signal processor 8 to display the matrix MT (blocking area specifying information specified by the two-dimensional data structure) as an image on the display screen 7a.

The two parameters r and θ may define the plane coordinates for each of the plurality of unit areas ΔAR at the bottom (ground surface) of the observation area AR. Regarding the observation area AR (each unit area ΔAR), when the obstacle 11 blocking the transmission signal B1 is located therein, the single parameter φ may specify the height of the obstacle 11 as an elevation angle. Further, the memory 9 may store the blocking area specifying information specified by these r, θ and φ in the two-dimensional data structure defined by the cells C arranged in a matrix. The blocking area specifying information may be stored in the memory 9 in advance at the time of shipping the weather radar apparatus 1 or may be stored in the memory 9 additionally through a network line after the weather radar apparatus 1 is shipped.

In this embodiment, in the matrix MT, two parameters r and θ out of the three parameters r, θ and φ may be defined as a component constituting a row and a component constituting a column, respectively. Further, in this embodiment, in the matrix MT, the other one parameter φ among the three parameters r, θ and φ may be stored in the cell C corresponding to the unit area ΔAR where the obstacle 11 is located at the bottom of the observation area AR.

As described above, in this embodiment, the plane coordinates may be the polar coordinates having the origin at the transmitting and receiving location P1 where the transmission signal B1 is transmitted and the reception signal B2 is received. Further, the two parameters r and θ defining the plane coordinates may be a coordinate in the azimuth direction Dθ around the transmitting and receiving location P1 (azimuth θ) and a coordinate in the distance direction DR from the transmitting and receiving location P1 (distance r).

In this embodiment, each cell C may be associated with a corresponding unit area ΔAR at the bottom of the observation area AR. That is, each cell C may be defined as a cell indicating the corresponding unit area ΔAR at the bottom of the observation area AR. Further in each cell C of the matrix MT, the two parameters r and θ specifying the plane coordinates in the corresponding unit area ΔAR at the bottom of the observation area AR may be defined as the component constituting the row and the component constituting the column.

More specifically, in this embodiment, one parameter θ may indicate a position in the azimuth direction Dθ from the transmitting and receiving location P1 (origin O), and be defined as the component constituting the column (horizontal axis) in the matrix MT. The other parameter r may indicate a position in the distance direction DR from the transmitting and receiving location P1 (origin O), and be defined as the component constituting the row (vertical axis) in the matrix MT. Note that the position of each cell C may be arranged corresponding to the position of the above-described unit area ΔAR.

In the cell C (C1 and C2) corresponding to the unit area ΔAR where the obstacle 11 is located, one parameter φ specifying the height of the obstacle 11 may be stored. This parameter φ may be the elevation angle φ of the obstacle 11, having the origin at the transmitting and receiving location P1. Note that in FIG. 4, the elevation angle φ may indicate an exaggerated value which is higher than an actual value.

As one example, as illustrated in FIGS. 3 and 4, a case may be considered in which the obstacle 11 (obstacles 111 and 112) is located in a state where the antenna 2 at the transmitting and receiving location P1 is oriented in an azimuth direction Dθ corresponding to a given column L1 in the matrix MT. In this case, the plurality of obstacles 111 and 112 may be located in the transmission direction of the transmission signal B1 (distance direction DR). A distance r2 from the transmitting and receiving location P1 to the obstacle 112 may be longer than a distance r1 from the transmitting and receiving location P1 to the obstacle 111.

In this case, the obstacle 11 may not be located between the transmitting and receiving location P1 and the obstacle 111. Therefore, the transmission signal B1 emitted from the antenna 2 at the transmitting and receiving location P1 may reach, without being blocked, to the position at which the obstacle 111 is located. Thus, the cell C in the zero-th row to the cell C in one row before the row corresponding to the position of the obstacle 111 (the cell C in the first row from the origin O, the cell C adjacent to the cell C corresponding to the distance r1) may be blank. In this manner, the cell C corresponding to the unit area ΔAR where the obstacle 11 is not located may be a blank cell which does not store data.

On the other hand, an elevation angle φ1 of the obstacle 111 from the transmitting and receiving location P1 may be 1 deg. When the elevation angle φ of the transmission signal B1 emitted from the antenna 2 may be equal to or smaller than the elevation angle φ1 (1 deg), the transmission signal B1 may be blocked by the obstacle 111 and not reach beyond the obstacle 111. Therefore, the reception signal B2 when the elevation angle φ is equal to or smaller than the elevation angle φ1 may not indicate a result of observing beyond the obstacle 111.

For this reason, data indicating that the elevation angle φ of the obstacle 111 is the elevation angle φ1=1 deg may be stored in the cell C1 corresponding to the position of the obstacle 111 in the given column of the matrix MT. That is, data indicating that the transmission signal B1 is blocked if the elevation angle φ is equal to or smaller than the elevation angle φ1 may be stored in the cell C1 corresponding to the position of the obstacle 111. In other words, at a position farther than the position corresponding to the cell C1, data indicating that the precipitation observation using the transmission signal B1 is possible if the elevation angle φ from the transmitting and receiving location P1 is larger than the elevation angle φ1 may be stored.

Note that the elevation angle φ may be a tilt angle of the transmission signal B1 with respect to the horizontal plane. When the transmission signal B1 is displaced to an increasing direction of the elevation angle φ of the transmission signal B1, the elevation angle φ of the transmission signal B1 immediately before the transmission signal B1 no longer intersects with the obstacle 11 may be defined as the elevation angle φ1 with respect to the given obstacle 11.

An elevation angle φ2 of the obstacle 112 from the antenna 2 may be 2 deg. When the elevation angle φ of the transmission signal B1 emitted from the antenna 2 is equal to or smaller than the elevation angle φ2 (2 deg), the transmission signal B1 may be blocked by the obstacle 112 and not reach beyond the obstacle 112. Therefore, the reception signal B2 when the elevation angle φ is equal to or smaller than the elevation angle φ2 may not indicate a result of observing beyond the obstacle 112. Therefore, among the cells C of the matrix MT, in the cell C2 corresponding to the position of the obstacle 112, data indicating that the elevation angle φ of the obstacle 112 is the elevation angle φ2 may be stored.

That is, in the cell C2 corresponding to the position of the obstacle 112, when the elevation angle φ is equal to or smaller than the elevation angle φ2, data indicating blockage of the transmission signal B1 may be stored. In other words, at a position farther than the position corresponding to the cell C2, if the elevation angle φ from the transmitting and receiving location P1 is larger than the elevation angle φ2, data indicating that the precipitation observation using the transmission signal B1 is possible may be stored.

Similarly, data indicating that the elevation angle φ is an elevation angle φ3 may be stored in a cell C (not illustrated) corresponding to the position of the obstacle 113.

With the above configuration, in the case where a plurality of obstacles 11 are located in the transmission direction of the transmission signal B1 (distance direction DR), the parameter for specifying the elevation angle φ (height) of the obstacle 11 may be set to become higher in a stepwise fashion as the distance from the transmitting and receiving location P1 to the obstacle 11 (111, 112 and 113) becomes longer.

In this embodiment, in the given column (azimuth θ1), the cell between the cell C1 corresponding to the position at which the obstacle 111 is located and the cell C2 corresponding to the position at which the obstacle 112 is located may be blank. In this manner, by not storing data in the cell C for the unit area ΔAR where the parameter φ does not increase, the data storage amount may be reduced. In other words, the parameter φ may be stored only when the value of the parameter φ increases in the case where the parameter r in the distance direction DR having the origin at the transmitting location P1 increases.

Also for other columns corresponding to other azimuths θ, similarly, the matrix MT may store information on the elevation angle φ (height) of the obstacle 11 in the cell C corresponding to the location where the obstacle 11 is located.

The signal processor 8 may be controlled by the controller 15 to display the blocking area 10 on the display screen 7a by using the blocking area specifying information stored in the memory 9. For example, the signal processor 8 may refer to the data stored in the memory 9 for each three-dimensional unit area ΔAR. For the unit area ΔAR where the blocking area 10 is located, data indicating that the unit area ΔAR is the blocking area 10 may be generated.

Further, the signal processor 8 may calculate the precipitation intensity by the processing described above, and generate color data etc. for displaying the precipitation intensity on the display screen. Here, the signal processor 8 may be configured to change the processing of the reception signal between the case where the antenna 2 transmits the transmission signal B1 to the unit area ΔAR where the obstacle 11 is located, and the case where the antenna 2 transmits the transmission signal B1 to the unit area ΔAR where the obstacle 11 is not located. Further, the signal processor 8 may be configured to generate display data for displaying an index indicating reliability of the reception signal in association with the blocking area specifying information, and to display an image based on the display data on the display screen 7a.

The signal processor 8 may output data specifying the blocking area 10 or the precipitation intensity for each unit area ΔAR as image data to the interface display device 7. Based on this image, the interface display device 7 may display the detection result of the weather radar apparatus 1 on the display screen 7a.

Figure 5:
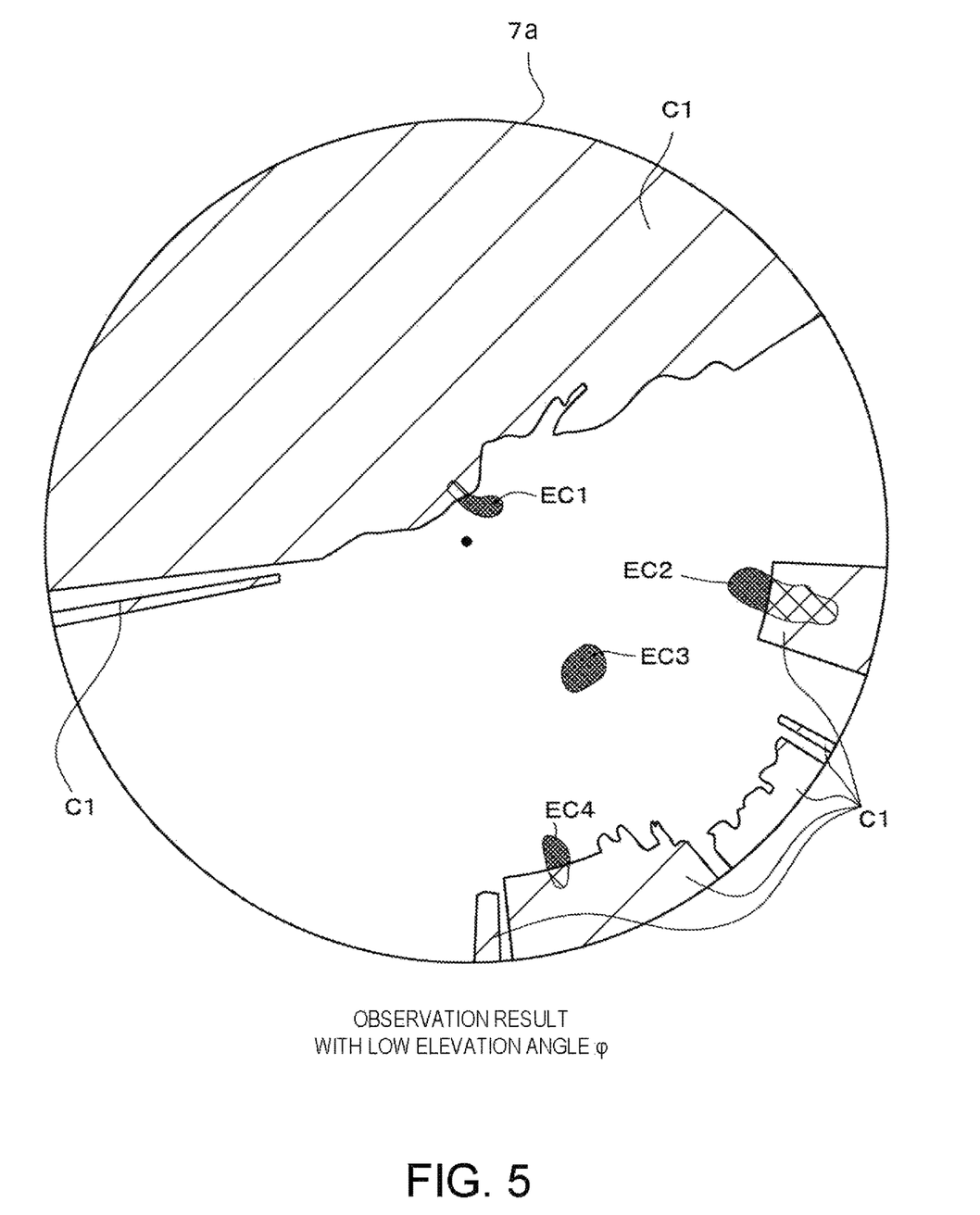
FIG. 5 is a view illustrating one example of an image displayed on a display screen of an interface display device of the weather radar apparatus, illustrating a case where an observation result with a low elevation angle is displayed on the display screen.

For example, FIG. 5 illustrates a case where the observation result measured using the transmission signal B1 with the elevation angle φ of 1 deg or smaller is displayed on the display screen 7a as a cross-sectional view of the elevation angle cp. In this case, illustration of the coarse hatching C1 may indicate that the position corresponding to a position farther than the obstacle 111 when seen from the transmitting and receiving location P1 on the display screen 7a is the blocking area 10 (101). On a portion of the display screen 7a, echo images EC1 to EC4 indicating precipitation areas may be displayed by cross hatching. In the echoes EC1, EC2 and EC4, the portion overlapping with the hatching C1 which indicates the blocking area 10 may be displayed differently from the portion not overlapping with the hatching C1. For example, it may be considered to change the display color of the echoes EC1, EC2 and EC4 in the portion corresponding to the blocking area 10 from the display color of the echo EC in the portion corresponding to the portion other than the blocking area 10. Examples of a change mode of the color here may include displaying in an inversion color or by overlaying gray (transparent color) with layer processing. Also in the blocking area 10, there may be a portion where the transmission signal B1 is not completely blocked because the beam (transmission signal B1) has a width. In such a portion, the echo level of the reception signal B2 may become weak and it may be difficult to accurately observe the precipitation. However, even by using such echoes (portions of the echoes EC1, EC2 and EC4), some level of observation may be performed. Therefore, such echoes (portions of the echoes EC1, EC2 and EC4) specifying echoes from the blocking area 10 may be displayed on the display screen 7a.

Figure 6:
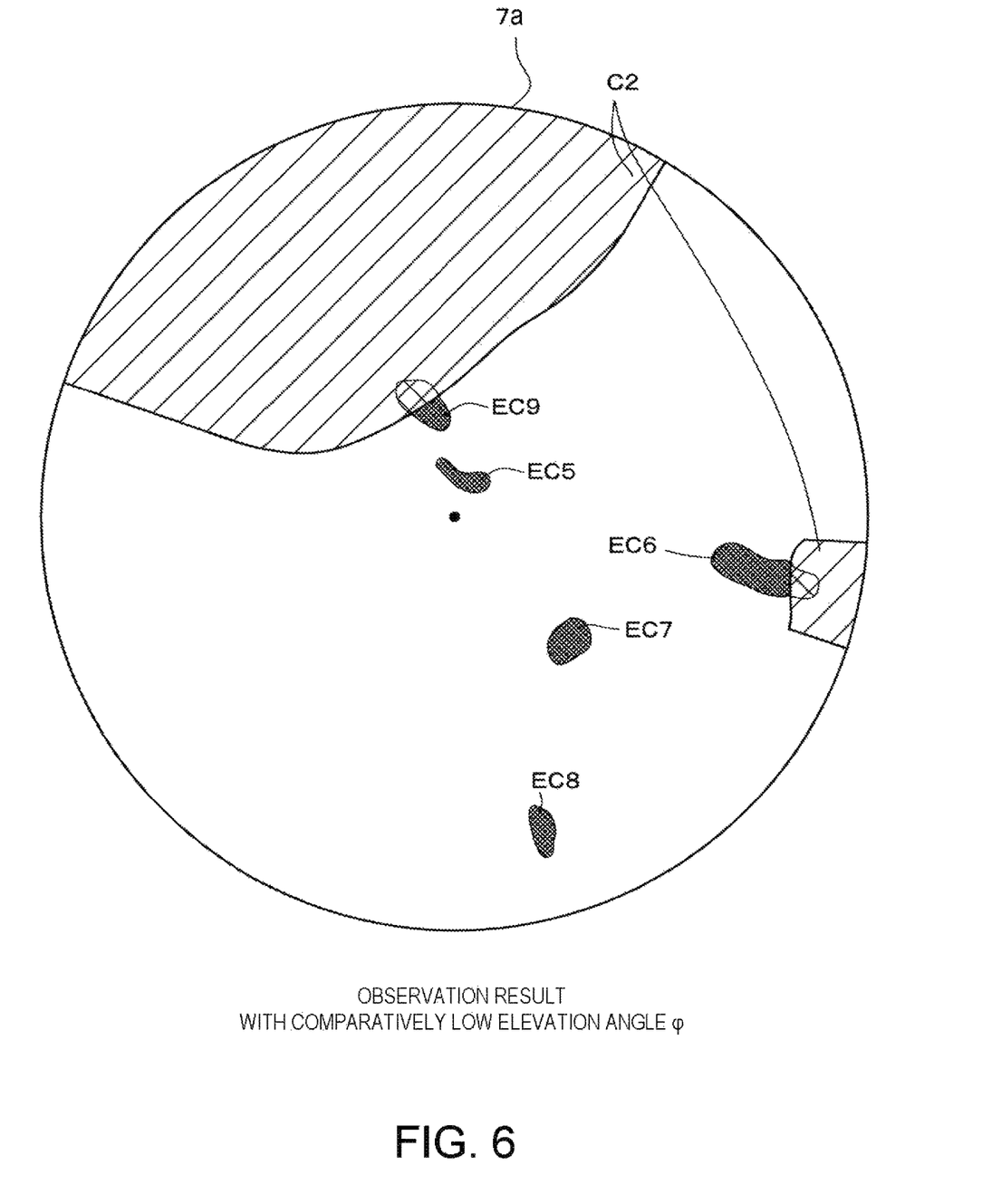
FIG. 6 illustrates a case where an observation result with a comparatively low elevation angle is displayed on the display screen.

Moreover, for example, FIG. 6 illustrates a case where the observation result measured using the transmission signal B1 with the elevation angle φ of 2 deg or smaller is displayed on the display screen 7a as a cross-sectional view of the elevation angle φ. In this case, illustration of the fine hatching C2 may indicate that the position corresponding to a position farther than the obstacle 112 when seen from the transmitting and receiving location P1 on the display screen 7a is the blocking area 10 (102). On a portion of the display screen 7a, echo images EC5 to EC9 indicating precipitation areas may be displayed by cross hatching. In the echoes EC6 and EC9, the portion overlapping with the hatching C2 which indicates the blocking area 10 may be displayed differently from the portion not overlapping with the hatching C2. The different display mode here may be the same as the observation result at the elevation angle φ1.

Figure 7:
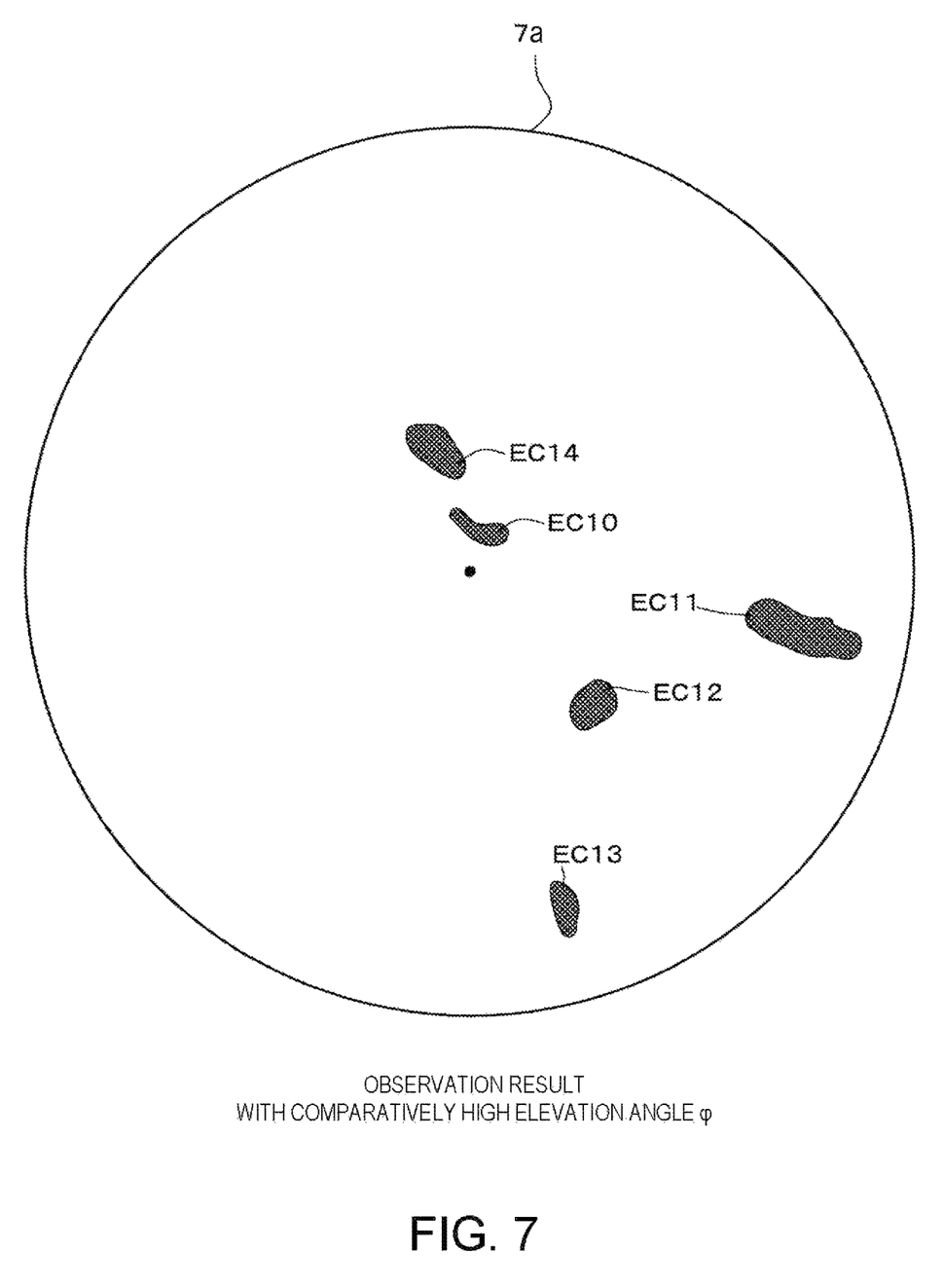
FIG. 7 illustrates a case where an observation result with a comparatively high elevation angle is displayed on the display screen.

Furthermore, for example, FIG. 7 illustrates a case where the observation result measured using the transmission signal B1 with an elevation angle φ larger than 2 deg is displayed on the display screen 7a as a cross-sectional view of the elevation angle φ. In this case, since the transmission signal B1 is not blocked by the blocking area 10 (101, 102 and 103), no indication of the blocking area 10 may be displayed on the display screen 7a. On a portion of the display screen 7a, echo images EC10 to EC14 indicating precipitation areas may be displayed.

Figure 8:
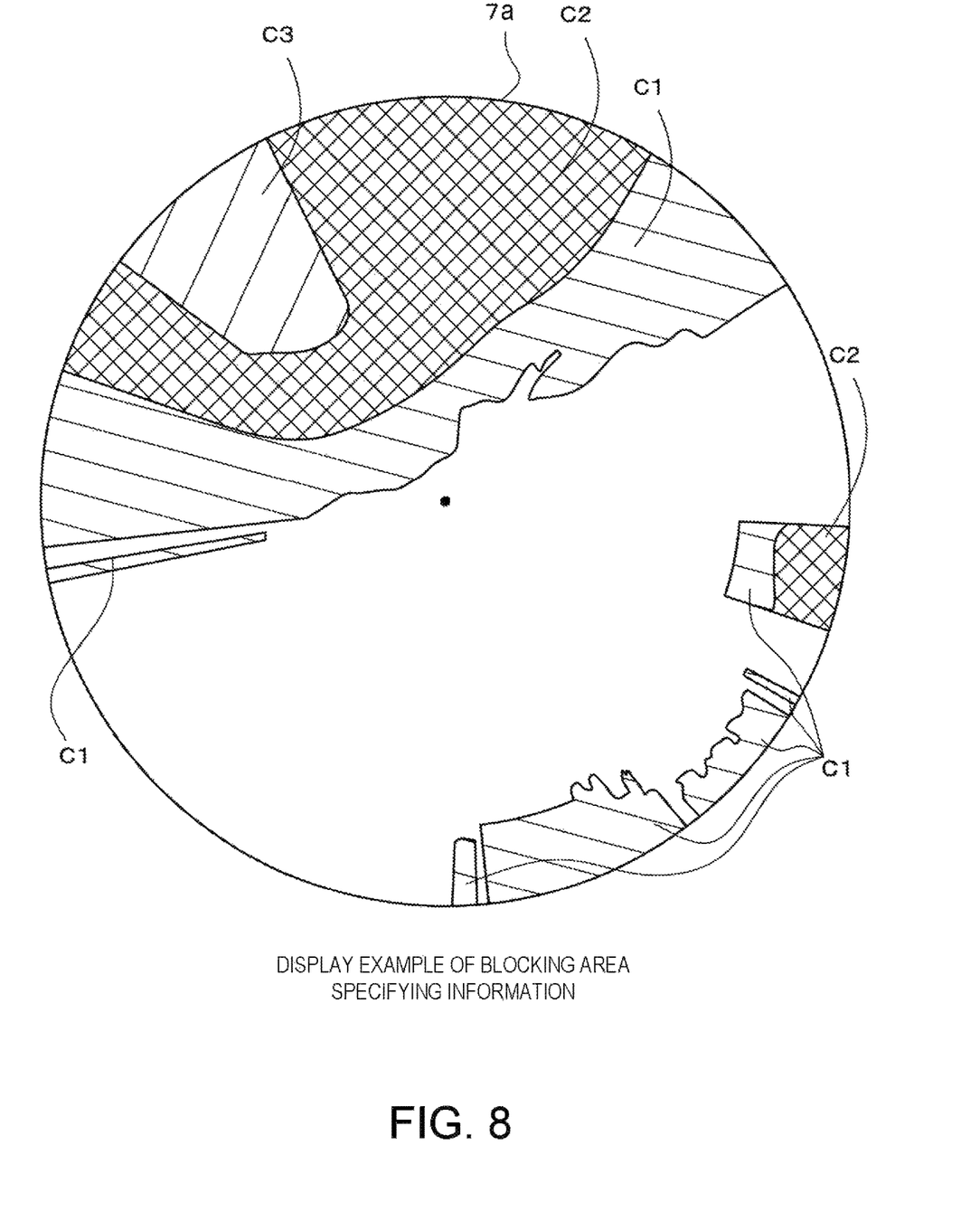
FIG. 8 illustrates a state where an image illustrating the blocking area is displayed in a plan view.

As described above, the controller 15 may be configured to be capable of causing the signal processor 8 to display the matrix MT (blocking area specifying information specified by the two-dimensional data structure) as an image on the display screen 7a. For example, when a three-dimensional image in the case where only the blocking area 10 is displayed on the display screen 7a is displayed in a plan view, it becomes a view as illustrated in FIG. 8. In this case, the blocking area 10 (101, 102 and 103) corresponding to the elevation angles φ1, φ2 and φ3 may be displayed on the display screen 7a by the hatchings C1, C2 and C3 as an example. This display may be performed separately from displaying the echo EC. Although the illustration in FIG. 8 is two-dimensional, it may also be displayed as a three-dimensional image. Note that, instead of the display of FIG. 8, the matrix MT in FIG. 3 itself may be displayed.

As described above, according to this embodiment, the two-dimensional data structure stored in the memory 9 may include the blocking area specifying information in which the height of the obstacle 11 when the obstacle 11 blocking the transmission signal B1 in the observation area AR is located is specified by the single parameter φ. With this configuration, the data structure which specifies the blocking area 10 in the three-dimensional observation area AR may be achieved with a small data amount. That is, this data structure may not need to be set for every unit height (unit elevation angle) of the observation area AR, and an extremely large number of three-dimensionally arranged cells (database) may not be needed. Therefore, according to this embodiment, the blocking area 10 where the transmission signal B1 is blocked at the time of observation by the weather radar apparatus 1 may be specified with an even smaller data amount. Further, the processing required for calculating the precipitation intensity which takes into consideration the blocking area 10 may be simplified.

Further, according to this embodiment, the plane coordinates of the obstacle 10 may be specified with a simple and small data amount of two parameters r and θ.

Further, according to this embodiment, in each cell C, two parameters (r and θ) specifying the plane coordinates of each unit area ΔAR may be defined as the component constituting the row and the component constituting the column in the matrix MT. Moreover, the parameter specifying the height of the obstacle 11 may be stored in the corresponding cell C. With such a configuration, the designer or the maintenance personnel of the weather radar apparatus 1 who looks at the matrix MT can more reliably grasp the position at which the obstacle 11 is located.

Further, according to this embodiment, each unit area ΔAR may be an area specified by the polar coordinates having the origin at the transmitting and receiving location P1. With such a configuration, it is possible to define each cell C of the matrix MT with reference to the same coordinate system as that of the reception signal B2 received by the antenna 2.

Further, according to this embodiment, the parameter specifying the height of the obstacle 11 may be the elevation angle φ of the obstacle 11 having the origin at the transmitting and receiving location P1. With such a configuration, a parameter suitable for specifying the obstacle 11 by taking into consideration the rectilinearity of the transmission signal B1 may be stored in the corresponding cell C of the matrix MT.

Further, according to this embodiment, in the case where the parameter in the distance direction DR having the origin at the transmitting and receiving location P1 where the transmission signal B1 is transmitted increases, the matrix MT may store the parameter φ only when the value of the parameter φ specifying the height of the obstacle 11 increases. With such a configuration, the data amount of the two-dimensional data structure may further be reduced.

Further, according to this embodiment, the signal processor 8 may be configured to change the processing of the reception signal between the case where the transmission signal B1 is transmitted to the unit area ΔAR where the obstacle 11 is located and the case where the transmission signal B1 is transmitted to the unit area ΔAR where the obstacle 11 is not located. Thus, the presence of the blocking area 10 may clearly be displayed on the display screen 7a.

Further, according to this embodiment, the signal processor 8 may be configured to display the blocking area specifying information specified by the two-dimensional data structure, in at least one mode among a table of the matrix (matrix MT), the two-dimensional image, and the three-dimensional image. With such a configuration, the operator of the weather radar apparatus 1 who visually recognizes the blocking area 10 through the display screen 7a can more reliably grasp the position of the blocking area 10.

Further, according to this embodiment, the signal processor 8 may be configured to generate the index indicating the reliability of the reception signal. The reliability index and the blocking area specifying information may be displayed on the display screen 7a in association with topography data of the observation area AR. Thus, for example, on the display screen 7a, highly reliable echoes (echoes EC not overlapping with the hatchings C1 and C2 indicating the blocking area 10) may be displayed in a manner which indicates the high reliability. On the other hand, the echo EC caused by the reception signal B2 from the obstacle 11 may have comparatively low reliability and be displayed in a manner which indicates the low reliability. Thus, the operator can more reliably recognize the reliability of the echo indicating precipitation.

Although the embodiment of the present disclosure is described above, the present disclosure is not limited to the above embodiment. The present disclosure may be variously modified within the scope of the claims. For example, it may be changed and implemented as follows.

(1) In the above embodiment, in the matrix MT, the mode in which the component of the column may be the azimuth θ and the component of the row may be the distance r is described as an example. However, it may not be the case. For example, the component of the row may be the azimuth θ and the component of the column may be the distance r. Further, in the matrix, the elevation angle φ may be the component of the row or the column. In this case, one of the azimuth θ and the distance r may be the component of the row or the column, and the other one may be a value stored in the cell C.

(2) Further, in the above embodiment, the mode in which the coordinate system of the observation area AR may be the polar coordinate system is described as an example. However, it may not be the case. For example, the coordinate system of the observation area AR may be an XY coordinate system.

(3) Further, in the above embodiment, the mode in which the height of the obstacle 11 may be specified by the elevation angle φ is described as an example. However, it may not be the case. For example, the height of the obstacle 11 may be specified by the overall height of the obstacle 11 (the height from the ground).

(4) Further, in the above embodiment, the mode in which the transmission signal B1 may be transmitted upwardly from the transmitting and receiving location P1 is described as an example. However, it may not be the case. For example, the transmitting and receiving location P1 may be set at a high location and the transmission signal B1 may be transmitted downwardly. In this case, a depression angle φ' may be used instead of the elevation angle φ. Even in this case, blocking area information similar to the case where the elevation angle φ is set may be stored in the memory 9.

(5) Further, in the above embodiment, although the weather radar apparatus 1 is described, it may not be the case. For example, the present disclosure may be applied to a radar apparatus configured to detect a ship etc., or may be used for an ultrasonic detection apparatus such as a sonar and a fish finder.

INDUSTRIAL APPLICABILITY

The present disclosure may broadly be applied as a detection apparatus and a detecting method.

DESCRIPTION OF THE REFERENCE NUMERALS 1 weather radar apparatus (detection apparatus)
8 signal processor
9 memory
10 controller
11 obstacle
AR observation area
B1 transmission signal
B2 reception signal

The invention claimed is:

1. A detection device, comprising:
a signal processor configured to perform detection processing of detecting a target object in a three-dimensional observation space by using a reception signal caused by a reflection of a transmission signal off the target object, the transmission signal transmitted from a transmitter installed at a predetermined transmitting location;
a non-transitory memory configured to store blocking area specifying information as a single parameter value of a maximum elevation angle reflected from an obstacle in the three-dimensional observation space, represented by a horizontal distance and an azimuth direction from the predetermined transmitting location, the blocking area specifying information being stored in the non-transitory memory in advance of the signal processor performing the detection processing; and
controller circuitry configured to control the detection processing to avoid processing areas blocked by the obstacle based on the blocking area specifying information.

2. The detection device of claim 1, wherein the blocking area specifying information specifies plane coordinates of the obstacle by two parameters.

3. The detection device of claim 2, wherein,
the two parameters that specify the plane coordinates include a row component and a column component that identify a cell in a matrix structure that is configured to hold the single parameter value.

4. The detection device of claim 3, wherein,
a plurality of unit areas are defined at a ground surface of the three-dimensional observation space,
each cell in the matrix structure is associated with a corresponding unit area,
the two parameters specifying plane coordinates of the unit area at the bottom of the three-dimensional observation space are the row component and the column component in the matrix structure, and
the single parameter value specifying a height of the obstacle is stored in the corresponding cell such that areas of successive transmission scans that are blocked by the obstacle at greater elevation angles than the bottom of the three-dimensional observation space are known prior to the successive transmission scans being performed.

5. The detection device of claim 2, wherein,
the plane coordinates are polar coordinates having an origin at the predetermined transmitting location, and
the two parameters specifying the polar coordinates are a coordinate in an azimuth direction around the predetermined transmitting location and a coordinate in a distance direction from the predetermined transmitting location.

6. The detection device of claim 1, wherein
the detection processing includes first detection processing that applies to a first area from the predetermined transmitting location to the obstacle, and second detection processing that applies to a second area that is farther from the transmitter than the obstacle.

7. The detection device of claim 1, wherein the signal processor displays the blocking area specifying information specified by the single parameter value, in at least one among
a table of a matrix,
a two-dimensional image, and
a three-dimensional image.

8. The detection device of claim 1, wherein the signal processor generates an index indicating reliability of the reception signal with respect to whether the reflection of the transmission signal has been blocked by the obstacle.

9. The detection device of claim 8, wherein the signal processor generates display data to display at least one of the index indicating the reliability and the blocking area specifying information in association with topography data of the three-dimensional observation space.

10. The detection device of claim 9, further comprising a display device configured to display a content based on the display data.

11. The detection device of claim 1, wherein the detection device is one of a weather radar apparatus, a radar apparatus, and an ultrasonic detection apparatus.

12. A detecting method, comprising:
   detecting with a signal processor a target object in a three-dimensional observation space by using a reception signal caused by a reflection of a transmission signal off the target object, the transmission signal transmitted from a transmitter installed at a predetermined transmitting location;
   storing in a non-transitory memory blocking area specifying information as a single parameter value of a maximum elevation angle reflected from an obstacle in the three-dimensional observation space, represented by a horizontal distance and an azimuth direction from the predetermined transmitting location, the blocking area specifying information being stored in the non-transitory memory in advance of the signal processor performing the detection processing; and
   controlling with circuitry the detecting to avoid processing areas blocked by the obstacle based on the blocking area specifying information.

13. The detection method of claim 12, wherein the blocking area specifying information specifies plane coordinates of the obstacle by two parameters.

14. The detection method of claim 13, wherein,
   the two parameters that specify the plane coordinates include a row component and a column component that identify a cell in a matrix structure that is configured to hold the single parameter value.

15. The detection method of claim 14, wherein,
   a plurality of unit areas are defined at a ground surface of the three-dimensional observation space,
   each cell in the matrix structure is associated with a corresponding unit area of the three-dimensional observation space,
   the two parameters specifying plane coordinates of the unit area at the bottom of the three-dimensional observation space are the row component and the column component in the matrix structure, and
   the single parameter value specifying a height of the obstacle is stored in the corresponding cell in the matrix structure such that areas of successive transmission scans that are blocked by the obstacle at greater elevation angles than the bottom of the three-dimensional observation space are known prior to the successive transmission scans being performed.

16. The detection method of claim 13, wherein,
   the plane coordinates are polar coordinates having an origin at the predetermined transmitting location, and
   the two parameters specifying the polar coordinates are a coordinate in an azimuth direction around the predetermined transmitting location and a coordinate in a distance direction from the predetermined transmitting location.

17. The detection method of claim 12, wherein in a case where a parameter in a distance direction having an origin at a transmitting location where the transmission signal is transmitted, when the value of the parameter specifying the height of the obstacle increases, the parameter is stored.

18. The detection method of claim 12, further comprising performing weather radar processing.

19. The detection method of claim 12, further comprising performing radar object detection processing.

20. The detection method of claim 12, further comprising performing ultrasonic detection processing.

21. The detection device of claim 1, wherein
   in response to a first obstacle being disposed at a first horizontal distance from the transmitter along a predetermined azimuth direction, a first maximum elevation angle as the a first single parameter value is stored in a portion of the non-transitory memory that corresponds to the first horizontal distance, and
   in response to a second obstacle that is taller than the first obstacle is disposed at a second horizontal distance from the transmitter along the predetermined azimuth direction, a second maximum elevation angle as the a second single parameter value is stored in a portion of the non-transitory memory that corresponds to the second horizontal distance.

22. The detection device of claim 6, wherein the detection processing includes generation of first display data for a display of a detection result; and
   the second detection processing generates second display data that does not display the detection result.

* * * * *